Figure 1:
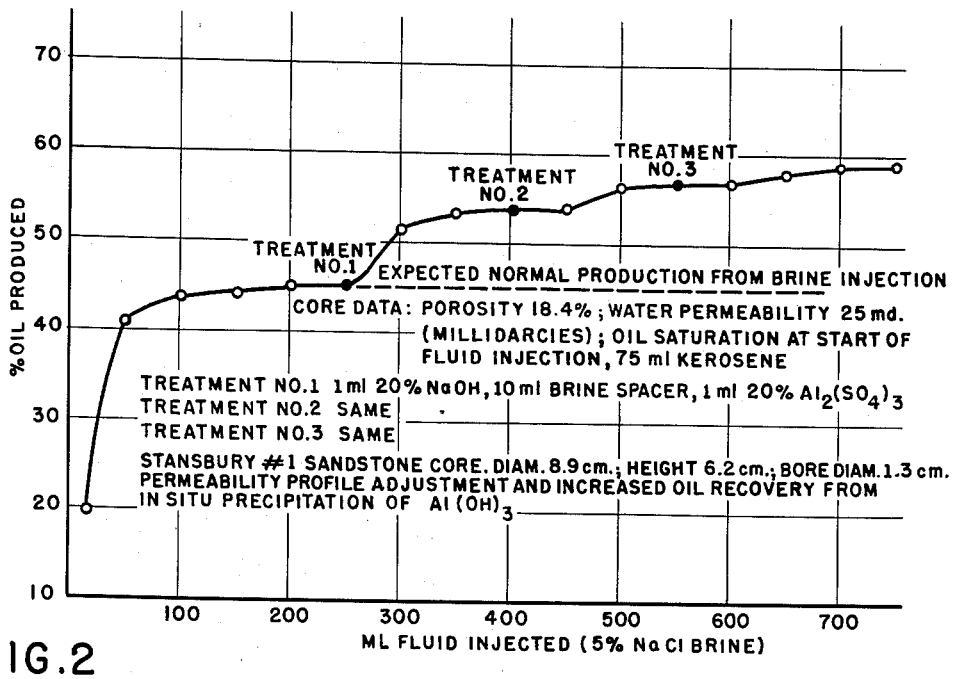

May 29, 1956  J. A. KING ET AL  2,747,670
METHOD OF INCREASING OIL RECOVERY
Filed Nov. 1, 1954

INVENTORS
JACK A. KING
WAYNE S. FALLGATTER

ATTORNEY

United States Patent Office 2,747,670
Patented May 29, 1956

2,747,670

METHOD OF INCREASING OIL RECOVERY

Jack A. King and Wayne S. Fallgatter, Tulsa, Okla., assignors to Cities Service Research and Development Company, New York, N. Y., a corporation of New Jersey Application November 1, 1954, Serial No. 466,006

13 Claims. (Cl. 166—21)

This invention relates to a method of recovering oil from subterranean oil bearing strata of varying permeability by injecting a fluid therein under pressure to force oil through the strata into an output well from which the oil is recovered. More particularly, this invention relates to an improved water flooding process, commonly known as a secondary recovery method, in which increased oil production is attained by the selective permeability adjustment of the flood bearing strata.

The deliberate flooding of an oil field for the purpose of reviving production of oil therefrom after initial depletion, has become a common practice in the oil industry. Normally, in carrying out this process, a series of input wells approximately equidistant from a producing well are drilled and exposed to the same oil producing strata. Fluid, such as water or brine, is forced down into the input wells under pressure, and out into the surrounding oil bearing strata at pressures sufficient to drive the oil from the strata and into the producing well. While this technique has been rather widely adapted in recent years, it is not without considerable mechanical problems and economic limitations, particularly those resulting from the use of excess amounts of water in proportion to the recovered quantities of oil.

The reason for the lack of uniform recovery of oil in these permeable strata is due, in part, to the peculiar structure in which the oil bearing starta are found. Underground oil reservoirs, in most cases, consist of layers of sand or rock and since no reservoir rock is perfectly uniform in composition, the permeability will vary across the rock face or stratum. By permeability we mean the measure of the rock's capacity for passing fluid through its pores. This capacity is usually expressed in darcies or millidarcies. A permeability of one darcy will allow the flow of one c. c. per second of fluid of one centipoise viscosity through an area one centimeter square under a pressure gradient of one atmosphere per centimeter.

In the normal flooding operation the ideal situation for maximum recovery of oil is obtained when the fluid drive is permitted to build up a wide band of oil in front of the driving fluid which moves uniformly toward the producing well. To keep this band of oil intact, and constantly moving toward the producing well, a substantially uniform permeability must exist throughout the strata. If this uniform permeability profile does not exist or is not provided, the flooding fluid will seek the areas of high permeability, and streaking or bypassing occurs with the consequent loss of some fluid driving energy and the appearance of excess flooding fluid in the producing well. Moreover, as the more permeable strata are depleted, the water has a tendency to follow these channels and further increase consumption of flooding water to a point where the process becomes economically undesirable. This maximum limit, in terms of recovered oil, is normally about 100 barrels of driving fluid per barrel of oil. It is, of course, desirable to operate at a much lower fluid to oil ratio, and normally 5 to 10 barrels of water to 1 barrel of oil is considered an acceptable operating condition.

In order to obtain such a flood water to oil ratio, control or adjustment of permeability has been attempted to provide the uniformity which overcomes the undesirable conditions noted above.

A variety of methods have been proposed to accomplish this plugging or control of permeability. For example, U. S. 2,272,672 discloses the use of solutions which on introduction into the permeable strata provide a precipitate which obstructs the pores and provides a limited control of porosity. Similarly, U. S. 2,238,930, discloses a method of sealing the pores of earth strata, utilizing a solution of a metal capable of forming an insoluble precipitate when the solution is brought into contact with the formation. To prevent premature precipitation, a stabilizing agent is used.

While these methods provide some measure of adjusting strata permeability, no effective method has been found by which selective controlled plugging, or adjustment of permeability, can be accomplished at a specific desired distance from the well in a manner that provides a smooth uniform permeability profile throughout the entire area surrounding an input well.

According to the method of selective plugging hereinafter described, such a permeability profile can readily be obtained with more complete control than was heretofore possible. The method of this invention permits an operator at ground level to selectively plug the strata to any degree that he desires and at any distance from the well that he desires, over any given area he desires. Moreover, the degree that permeability is adjusted in that area can be so controlled according to this improved plugging method that upwards of 30% more oil can be obtained than was heretofore possible by conventional water flooding. This invention broadly contemplates the treatment of any fluid permeable strata into which chemical solutions can be introduced. More specifically, the invention relates to the introduction into an input well of a water flooding operation of two oil insoluble solutions containing chemically active components which will react at a given time to produce a precipitate which will effectively reduce the water permeability of the area into which the solutions have been introduced. The control of this reaction between the solutions to limit the position of the precipitate or the amount of precipitate laid down and the area in which this precipitate is produced is obtainable by the use of a spacing liquid injected into the well between the two chemically active solutions during their introduction into the well.

Figure 2:
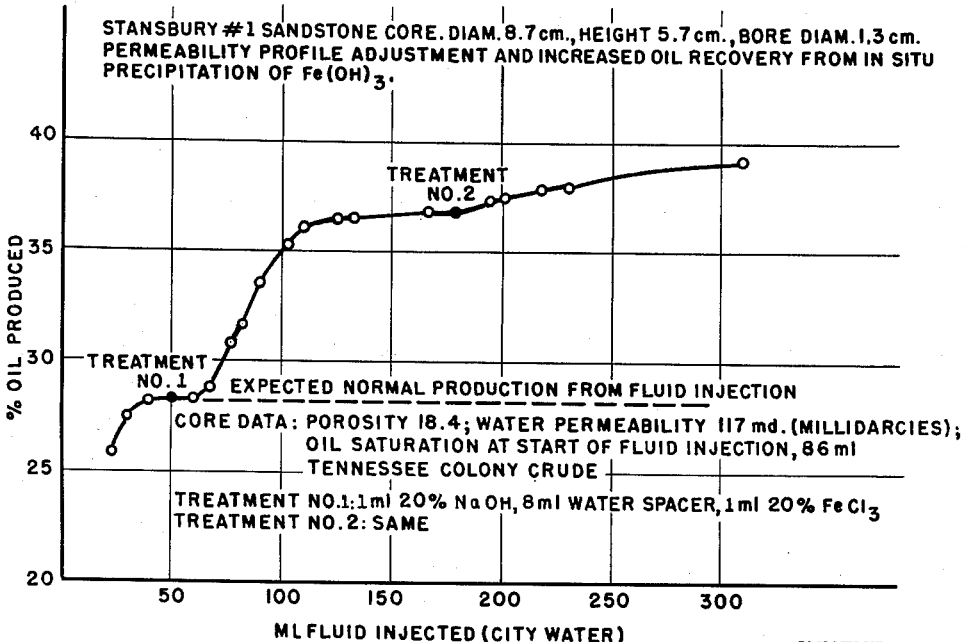

In Figures 1 and 2, curves are plotted from oil production and water or brine injection data obtained from tests carried out on cores according to the method hereinafter described. In Figure 1, the curve shows percentage increase in oil produced during a brine flooding of the core after three successive treatments according to our invention. These data are based on the test carried out and described in Example 1 which follows. Figure 2 graphically describes the increase in oil production obtainable by a water drive on a saturated core after two treatments according to the method of this invention. These data are obtained from the treatment of the core described in Example 2 which follows.

In carrying out this method of permeability adjustment within the formation, a chemical solution is first introduced into the well followed directly by a quantity of an inert spacing fluid. These two solutions are immediately followed by the introduction of a third solution containing a chemical component which on contact with the reactive component of the first solution will cause a precipitate to be formed.

These reactive solutions and the spacing medium after introduction into the well are followed by pressurized driving fluid, permitting them to move out regularly in the formation in ever increasing circular bands from the injection or input well. As these bands move outwardly, they gradually approach each other as the spacing medium band narrows due to the geometric relationship of the distance of the band from the well.

When the two solutions, for example, ferric chloride and sodium hydroxide begin to contact each other in the strata, reaction occurs and precipitation of an insoluble mass of ferric hydroxide occurs. This precipitation continues gradually as the solutions move outwardly through the strata under the influence of the driving liquid. Precipitation will occur in the pores in an amount depending on the proximity of the bands and in decreasing degree as the reacting chemicals present are exhausted.

It will be readily apparent that the amount of liquid used as the spacing medium or the distance by which the reacting solutions are separated during passage through the strata prior to contact, provides a positive method of controlling the point at which precipitation effectively begins. Spacing of the solutions by the inert spacing medium prevents premature precipitation and allows the solutions to pass into those strata wherein control of pore size is desired before the separating band has so adjusted its size in terms of the distance travelled from the well bore that contact of the solutions occurs to produce the desired precipitate. According to this method, it will also be obvious that in view of the absence of premature precipitation, plugging of the strata immediately adjacent to the well bore cannot occur.

We have found that a wide variety of water soluble salts of various metals can be used as one of the reactant solutions necessary to produce the desired precipitate. For example, water soluble salts of iron, aluminum, calcium, cobalt, nickel, copper, mercury, silver, lead, chromium, zinc, cadmium and magnesium may be used. The water soluble salts of these metals produce a precipitate of a basic metal compound when brought into contact with an alkaline solution.

The solutions of these salts may be of varying strength depending on the particular strata in which permeability adjustment is desired and the degree of adjustment necessary. Normally, we prefer to use an aqueous solution of from 5 to 25% by weight of the active component.

In order to obtain the desired precipitate as above described, the introduction of a second solution into the well is necessary. A number of alkali solutions can be used. Here again, we prefer to use aqueous solutions of alkali in a strength of from 5 to 25% by weight and have found that solutions of sodium hydroxide and sodium carbonate will react with the foregoing metals under the conditions in which this method is carried out to provide an insoluble precipitate having properties most effective in plugging the pores of the strata and providing the desired permeability profile. While we have indicated but a few of the alkali solutions useable, it is understood that a number of other solutions, such as sodium borate, sodium bicarbonate, sodium silicate, sodium phosphate or other soluble salts of these anions such as potassium, ammonium and the like, would serve equally as well.

In selection of the particular reactants to be used, some consideration is necessary of the type of precipitate desired to be formed by the reactants. Generally, it is desirable to produce a gelatinous type of precipitate which will form an insoluble deposit, which will adhere to the pore walls. Such a precipitate is desirable in view of the relatively high pressures existing on the driving fluid which in turn will be effected against the precipitate. While it is indicated above that a wide variety of compounds of solutions can be used in effectively carrying out this method, consideration should be given to the selection of appropriate solutions with respect to the strata in which the desired precipitate is expected to be formed. As is well known certain types of strata contain various mineral substances which are capable of reacting with chemical solutions to form precipitates. In addition, the naturally existing brines also contain mineral substances capable of reacting with certain chemical solutions to form undesirable precipitates. To avoid such occurrences, care should be taken to select as the reactant components those chemicals which will be inert to the surrounding strata on introduction into the well.

As described above, control of the precipitate formation as to place, concentration, and area, is a function of the space by which the two solutions are separated, as they move through the strata prior to reacting. We have found that water, or brine, makes an ideal separating medium. Other inert water soluble oil insoluble liquids could be used, for example, methanol. In most cases, however, the readily available brine will be used.

The critical aspect of the spacing liquid, however, is not in the composition, but rather in the amount of liquid used. Since the time of reaction of the solutions and the depth of penetration from the well bore depends on the volume of spacing liquid used, some means must be provided for determining what volume will place the deposit at the desired position.

In most flooding operations there will be readily available reservoir rock data, such as the percent porosity of the strata, the thickness of the oil producing zone, and the oil and water saturation data. Other data based on past experience with the particular field will also be available. On the basis of this information, a decision may be made as to the desirable penetration or depth of permeability adjustment. Additionally, this available information will indicate to an operator the degree of plugging desired. This, of course, is based on the volume of driving fluid necessary to obtain one barrel of oil. If the fluid drive consumption is high, a high degree of permeability adjustment may be required.

With this information available, we can estimate the specific amount of spacing liquid required to place the precipitate at a desired distance from the injection point, where it will be most effective in preventing the undesirable streaking and bypassing. Where a more accurate position of deposit is desired the equation, $V=2\pi rwhps$, will provide the specific volume of spacing liquid required. In the equation, $V=2\pi rwhps$, $r=$distance from the injection well at which the laying down of precipitate is desired to start, $w=$width of spacer liquid band desired, $h=$thickness of zone being treated, $p=$porosity, and $s=$average water saturation up to point where the reaction is to start. As described hereafter, the foregoing expression permits the solutions to begin to react at the specific point at which permeability adjustment is required.

In order to more clearly describe the utility of the foregoing equation in determining the volume of spacing liquid required to adjust permeability in a specific area, we will assume the treatment of a sandstone formation 10 ft. thick, having a porosity of 20%, with 30% of the pore volume being occupied by water, and 70% of the pore volume being occupied by oil. Permeability adjustment is desired in a zone extending from a circle 20 ft. from the well bore to a circle 70 ft. from the well bore.

While the input well to be treated is full of normal injection fluid (normal injection fluid refers to the particular fluid used in the flooding operation, each operation having its own type of driving medium, often broadly classified as fresh water or brine water), a few barrels (42 gal./barrel) of 14% NaCl is injected. This solution will prevent mixing of the chemical treating solutions with the normal injection fluid and thereby avoid premature precipitation. The quantity of NaCl solution added can be varied somewhat depending on the tubing diameter and depth of the well. Following the NaCl solution, 104 barrels of 10% $Na_2CO_3$ are injected followed by 6.7 barrels of the NaCl solution. The quantity of spacer liquid is determined as follows: $V=2\pi rwhps$, where $r$, distance from the well bore at which reaction is to start=20 ft.; $w$, width of spacer liquid band=0.5 ft.; $h$, thickness of zone being treated=10 ft.; $p$, porosity=20%; $s$, average water saturation up to point where reaction is to start=30% or $V = 2 \times 3.14 \times 20 \times 0.5 \times 10 \times 0.20 \times 0.30 =$
$37.7$ cu. ft.$= 282$ gallons After addition of the spaced liquid, 89 barrels of 12% $FeCl_3$ is added to the input well. The quantities of carbonate and iron used are based on the finding that a formation of the assigned characteristics contained approximately 1 lb. of iron per 100 cu. ft. of rock treated. In the foregoing, the total volume of the formation is: $3.14 \times 10 \times (70^2 - 20^2) = 141{,}500$ cu. ft., hence 1415 lbs. of iron or 4090 lbs. of $FeCl_3$ and 4020 lbs. of $Na_2CO_3$ are necessary to produce the desired reaction.

Reference to the specific examples of this process which follow and associated Figs. 1 and 2 will more clearly describe our invention.

Example I

A section of core from the Stansbury No. 1 well was cut to the following dimensions: diameter 8.9 cm., height 6.2 cm., and center bore diameter 1.3 cm. This core was mounted in a core holder to sit in the same relative position as it was in the rock reservoir. The top and bottom of the core are sealed with rubber gaskets and a threaded ½-inch bolt passing through the center bore allows steel plates to be squeezed against the rubber gaskets. Fluid flow is then only possible through the center bore of the core to the outside cylindrical face of the core or vice versa. The core and plates were surrounded with a plastic cylinder. A seal was made between the plastic cylinder and steel plates by two rubber O-rings. This formed an annular space around the core. The end plates were provided with two valves furnishing outlets at the top and bottom of the center bore and the top and bottom of the annular space.

The core was dehydrated by flowing therethrough, radially from the center bore, 100 ml. of isopropyl alcohol, 200 ml. of hexane and dried under vacuum. The core was acidized with dilute HCl to insure removal of prior plugging materials, then washed with water to remove the acid, 100 ml. isopropyl alcohol to remove the water, and 200 ml. of hexane to remove alcohol or residual oil and to dry the core. The core was placed under vacuum; the vacuum operated from the annulus across the rock flow path into the center bore. Kerosene was pulled into the rock from the center bore under vacuum. 75 ml. of kerosene was required for saturation, this being essentially the available pore space in the core. The injected fluid used was a 5 weight percent sodium chloride brine. The order of introduction of plugging chemicals was: (A) 1 ml. 20 weight percent NaOH, 10 ml. 5 weight percent NaCl brine spacer; (B) 1 ml. 20 weight percent $Al_2(SO_4)_3$. Three treatments were used. The results are shown in the production curve in Figure 1. Selective plugging and permeability profile modification gave increased oil recovery based on the expected normal maximum production from brine injection of about 19% for treatment 1, 6% for treatment 2, and 5.5% for treatment 3.

The following example is included to provide quantitative data on the amount of oil recovered per unit of iron deposited in the core using a ferric hydroxide plug. In the core used in this example, the flow path of fluids being relatively short permit some of the chemicals to pass directly through, thus failing to contribute to the plugging. By determining the total iron entering the core and the amount passing through, deposited iron within the core was determined by difference.

Example II

A Stansbury No. 1 sandstone core, 8.7 cm. in diameter, 5.7 cm. high, and 1.3 cm. in bore diameter was mounted in a core holder as described in Example I. The core holder was completely plastic to prevent outside contamination from metal parts. The core was thoroughly acidized with dilute HCl, washed with water, washed with isopropyl alcohol, and hexane, and dried under vacuum. While under vacuum, the core was saturated with 86 ml. of Tennessee Colony crude. At this point, water injection was started and a normal oil production curve established (see Figure 2). At the point where oil production had nearly ceased, treatment 1 was carried out in the following order: (1) solution A–1 ml. 20% by weight NaOH, followed by (2) 8 ml. water spacer, and (3) solution B–1 ml. 20% by weight $FeCl_3$. After treatment 1, water injection was continued until the oil production had again nearly ceased. The core face and annular space were rinsed with dilute acid to recover the Fe and this was added to the Fe in the produced water. Analysis of this solution gave a value for Fe passing through the core. At this time, treatment 2 was carried out in the same way as treatment 1 with recovery and analysis of the Fe (see Figure 2). Treatment 1 yielded 187 ml. oil/gm. Fe and treatment 2 yielded 60.5 ml. of oil/gm. Fe. Based on the expected normal oil production from water flooding, treatment 1 gave about 30% additional oil and treatment 2 gave 8% additional oil.

It will be apparent from the foregoing examples that the process described herein provides an economic method for the selective plugging of permeable strata to provide smooth permeability profile not heretofore available.

In carrying out this method in a field operation, the procedure followed would be that generally described above in Examples I and II. Normally, the well would be treated during the flooding operation by injecting into the well the first solution. This solution would then be followed by the predetermined volume of spacing liquid calculated on the basis of the formula previously discussed and directly followed by the third solution containing the other reactant component necessary for the precipitate formation.

In some cases, it may be desirable in field operations to inject a solution of NaCl into the well prior to the injection of the first active solution. In circumstances where a natural brine is being used as the driving fluid, which is the normal case, the NaCl would prevent mixing of the reactant solutions with the calcium and magnesium, generally present in such a natural brine.

The selection of the particular solution to be first inserted into the well will, of course, vary and depend on the nature of the strata as previously mentioned. When flooding is conducted in limestone strata, for example, it would be undesirable to first inject the solution of ferric chloride, for example, since ferric chloride would react quickly with the calcium carbonate and prematurely produce precipitation which will prevent proper penetration of the desired plug. Under these circumstances, it would be more desirable to use as the initial solution, calcium chloride, for example, followed by the spacer liquid and a solution of sodium carbonate to provide a calcium carbonate precipitate.

If desired, depending on the structure of the strata being treated, the injection process can be repeated any number of times as desired until the degree of plugging is accomplished sufficient to satisfy the economies of the water flooding process.

Another feature of importance in this invention is the selection of reactant solutions for particular strata which in addition to providing the desired plugging effect, produce additional driving means in the form of a generated gas. For example, when the reactant solutions are sodium carbonate and ferric chloride reacting according to the following reaction:

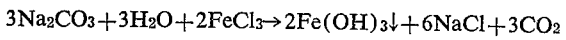

$3Na_2CO_3 + 3H_2O + 2FeCl_3 \rightarrow 2Fe(OH)_3 \downarrow + 6NaCl + 3CO_2$ the $CO_2$ produced will act as an additional driving fluid. Additionally, the $CO_2$ on dissolving in the oil present in the strata will effectively reduce its viscosity thereby increasing its flow. Such a reaction is generally obtainable when secondary recovery is being carried out in sandstone or calcareous sandstone formations. Careful selection of reactant solutions will provide a most effective recovery of oil.

Consideration should also be given to the fact that this method prevents premature precipitation at the well bore and therefore avoids the plugging of that strata immediately adjacent to the well bore as normally occurs in conventional methods. The limitation of precipitation by means of the volume control of spacer liquid as provided for according to the described method of selective adjustment presents a specific and unique control of permeability profiles not heretofore available in secondary water flooding processes.

We claim as our invention:

1. The method of selectively adjusting the permeability of oil producing formations which comprises introducing into the formation in the vicinity of undesirable fluid flow two solutions, insoluble in oil, capable of reacting on contact to produce an insoluble precipitate adapted to adjust the permeability of the strata and reduce undesirable fluid flow therein, and controlling the area and position of the precipitate in the formation being regulated by separating said solutions during their introduction and passage through the formation with a spacing medium, the volume of said spacing medium being determined according to the equation $V=2\pi rwhps$, wherein $r$=distance from well bore at which reaction is to start; $w$=width of spacer liquid band desired; $h$=thickness of zone being treated; $p$=porosity of strata; and $s$=average water saturation up to the point where the reaction is to start.

2. The method of selectively adjusting the permeability of oil producing formations as claimed in claim 1 wherein the spacing medium is substantially inert to both solutions.

3. The method of selectively adjusting the permeability of oil producing formations as claimed in claim 1 wherein the spacing medium is a naturally occurring brine.

4. The method of selectively adjusting the permeability of oil producing formations as claimed in claim 1 wherein the spacing medium is water.

5. The method of selectively adjusting permeability of a formation to increase oil recovery in a flooding operation which comprises creating at least one flooding well and an oil production well in the oil bearing formation, introducing a driving medium under pressure into said flooding well to force residual oil in the formation toward the production well, injecting into the input well a first chemically active solution, immediately following said first solution with an inert spacing liquid, following said inert spacing liquid with a second chemically active chemical solution which on contact with said first solution will react with the same to produce an insoluble precipitate in the pores of the formation, thereby adjusting its permeability, controlling the place of reaction between the chemically active solutions in the desired strata by the volume of spacing liquid introduced between the chemically active solutions, said volume being determined according to the equation $V=2\pi rwhps$, wherein $r$=distance from well bore at which reaction is to start; $w$=width of spacer liquid band desired; $h$=thickness of zone being treaetd; $p$=porosity of strata; and $s$=average water saturation up to the point where the reaction is to start.

6. The method of selectively adjusting permeability of a formation to increase oil recovery in a flooding operation as claimed in claim 5 wherein the first introduced chemically active solution is substantially inert to the surrounding strata.

7. The method of selectively adjusting permeability of a formation to increase oil recovery in a flooding operation as claimed in claim 5 wherein the first introduced chemically active solution is substantially inert to the driving medium.

8. The method of selectively adjusting permeability of a formation to increase oil recovery in a flooding operation as claimed in claim 5 wherein a quantity of inert spacing liquid is introduced into the well immediately before the first chemically active solution, thereby preventing premature precipitation of the reactive component by reaction with active components in the formation.

9. In a water flooding operation for the secondary recovery of oil, the method of selectively adjusting permeability of the strata which comprises introducing into an input well a first oil insoluble, solution containing at least one chemically active component, introducing an inert spacing liquid into the well immediately following said first solution, introducing a second oil insoluble solution containing at least one chemically active component immediately following said inert spacing liquid, the chemically active components of the first and second solutions being capable of reacting to produce an insoluble precipitate in the area of reaction, controlling the area and position of precipitate formation in the strata by predetermining the volume of spacing liquid required according to the equation, $V=2\pi rwhps$, wherein $r$=distance from well bore at which reaction is to start, $w$=width of spacer liquid band desired, $h$=thickness of zone being treated, $p$=porosity of strata, and $s$=average water saturation up to the point where the reaction is to start.

10. In a water flooding operation for the secondary recovery of oil, the method of selectively adjusting permeability of the strata as claimed in claim 9 wherein one of the solutions is an aqueous metal solution containing a metal selected from the group consisting of iron, aluminum, cobalt and nickel.

11. In a water flooding operation for the secondary recovery of oil, the method of selectively adjusting permeability of the strata as claimed in claim 9 wherein the chemically active solutions are ferric chloride and sodium hydroxide.

12. In a water flooding operation for the secondary recovery of oil, the method of selectively adjusting permeability of the strata as claimed in claim 9 wherein the chemically active solutions are aluminum chloride and sodium hydroxide.

13. In a water flooding operation for the secondary recovery of oil, the method of selectively adjusting permeability of the strata as claimed in claim 9 wherein the chemically active solutions are aluminum sulfate and sodium hydroxide.

References Cited in the file of this patent

UNITED STATES PATENTS

| 2,001,350 | Mills | Apr. 20, 1934 |
| 2,272,672 | Kennedy | Mar. 23, 1936 |
| 2,238,930 | Chamberlain et al. | Dec. 14, 1937 |